United States Patent [19]
Lerchenfeld et al.

[11] Patent Number: 5,807,603
[45] Date of Patent: Sep. 15, 1998

[54] STABILIZER SYSTEM AND METHOD FOR LESSENING THE SEPARATION OF SOLIDS IN JUICE-CONTAINING PRODUCTS

[75] Inventors: Erich P. Lerchenfeld, Altamonte Springs; Joe R. De Leon, Longwood; Richard A. Schlottmann, Apopka, all of Fla.

[73] Assignee: The Coca Cola Company, Atlanta, Ga.

[21] Appl. No.: 770,766

[22] Filed: Dec. 19, 1996

[51] Int. Cl.[6] .................. A23L 1/0532; A23L 1/0534; A23L 2/02
[52] U.S. Cl. .................. 426/599; 426/519; 426/575; 426/616
[58] Field of Search .................. 426/599, 575, 426/519, 616

[56] References Cited

U.S. PATENT DOCUMENTS 4,433,000   2/1984   De Leon et al. .................. 426/599
5,616,358   4/1997   Taylor et al. .................. 426/590

*Primary Examiner*—Helen Pratt
*Attorney, Agent, or Firm*—Kenyon & Kenyon

[57] ABSTRACT

The tendency of solids in fruit juice-containing products, particularly citrus fruit juice-containing products, to separate from the product is greatly reduced or prevented by incorporating relatively small quantities of a stabilizer system containing propylene glycol alginate and sodium carboxymethylcellulose. The stabilizing system is an aqueous slurry of propylene glycol alginate and sodium carboxymethylcellulose. The slurry is incorporated directly into the base for the product which is homogenized, prior to reconstitution with water. This permits effective stabilization of the finished single-strength product using lesser quantities of propylene glycol alginate and sodium carboxymethylcellulose than was heretofore possible.

26 Claims, No Drawings

STABILIZER SYSTEM AND METHOD FOR LESSENING THE SEPARATION OF SOLIDS IN JUICE-CONTAINING PRODUCTS

BACKGROUND OF THE INVENTION

1. Field of the Invention

The present invention relates to fruit juice-containing products and, in particular, to a method and stabilizer system for preventing the separation of insoluble solids in such products which would otherwise occur.

Fruit juice-containing products, ie., aqueous-based beverages or preparations containing fruit juice (as well as concentrates from which such beverages or products may be prepared), are well-known in the art and have achieved a relatively high degree of commercial acceptance. A known difficulty with such products, however, is the separation of the fruit juice insoluble solids (e.g., pulp) in the product, that is, the difficulty in maintaining the fruit juice insoluble solids in suspension or dispersion in the beverage or preparation over a prolonged period of time. As a result, at the time of purchase and consumption of the product, the fruit juice insoluble solids often will have either settled toward the bottom of the container or floated toward the surface, depending upon the relative densities of the insoluble solids and the liquid product. In either event, the product is nonuniform in composition throughout the container, usually having a very clear or translucent appearance except for the discrete sedimentation.

Although agitation of the fruit juice-containing product in its container prior to use generally will provide the desirable uniform drink or preparation, many consumers either forget to take this measure or find it cumbersome or difficult to do so, particularly where the product, e.g., beverage, is packaged for purchase in a large volume container such that product will be poured therefrom on a periodic basis, i.e., after being re-stored for a time sufficient to result in re-separation of insoluble solids. In addition, for certain fruit juice-containing products, once the fruit juice insoluble solids have separated, it is difficult to reinstate the desired suspension, even with agitation, owing either to the nature of the solids per se or some interaction (e.g., agglomeration) between separated particles which alters their solubility or redispersibility in the product.

Fruit juice-containing products packaged in transparent or translucent, (e.g., glass or plastic), containers present an added difficulty with respect to the aesthetically undesirable visible presence of insoluble solids at the bottom or top thereof at the time of purchase by the consumer.

Prior art attempts at overcoming these difficulties typically make use of natural or synthetic additive materials as stabilizers in an effort to maintain the juice insoluble solids in suspension. Most such additive systems proposed simply are ineffective for this purpose, particularly in highly acidic products having a pH of about 4.0 or less. Moreover, the additives proposed often rely per se on their ability to increase the viscosity of the product in order to more effectively maintain the insoluble solids in suspension, or contribute this property incident to their stabilizing function. As a result, the final product is undesirably thickened and often exhibits an undesirable mouthfeel.

U.S. Pat. No. 4,433,000 teaches a stabilizer system which addresses the above described problems. The stabilizer system includes a low viscosity propylene glycol alginate and sodium carboxymethyl-cellulose which are added to a juice-containing product in amounts of 0.015 to 0.20% w/w and 0.01 to 0.10% w/w, respectively, based upon the total weight of the single strength juice-containing product. The addition of these amounts of the stabilizing agents to the single strength juice-containing product significantly reduces the undesirable separation of insoluble solids without significantly increasing the viscosity of the product. The patent teaches that the method of incorporating the stabilizing agents into the juice-containing product is not critical so long as dispersion and hydration of the stabilizing agents is achieved (col. 2, 1. 56–58). Thus, the patent teaches a variety of different methods for incorporating the stabilizing agents into the product, including: direct addition into the beverage mixture; addition to only a portion of the beverage mixture followed by addition of the remaining ingredients of the final products; hydration of the stabilizing agents in a separate vessel followed by addition of the hydrated agents to the main ingredients; dry blending of the stabilizing agents with the ingredients of the juice-containing product and other methods (col. 1, 1.58 to col. 3, 1.12).

Although the stabilizers taught by U.S. Pat. No. 4,433,000 are effective in reducing sedimentation, the stabilizing agents used are relatively expensive and hence their use in relatively large quantities greatly increases the product costs for the stabilized juice-containing product. In addition, it would be desirable to even further lessen the separation of insoluble solids which can still occur over long periods of time when using the stabilizing system of U.S. Pat. No. 4,433,000.

SUMMARY OF THE INVENTION

Accordingly, it is an object of the invention to provide a stabilizing system and method for further reducing separation and sedimentation of juice insoluble solids in fruit juice-containing products.

It is a further object of the invention to provide such a system and method which does not greatly increase product costs.

Another object of the invention is to provide fruit juice-containing products exhibiting improved resistance to separation of juice insoluble solids without increasing viscosity or imparting a slimy or gummy mouthfeel to the products.

These and other objects of the invention are attained by the inclusion of a mixture of relatively small quantities of propylene glycol alginate and sodium carboxymethylcellulose in the beverage base for the fruit juice-containing product. In particular, it has been discovered that amounts of propylene glycol alginate and sodium carboxymethyl-cellulose which are less than those used in the prior art can effectively reduce the separation of insoluble solids in a juice-containing product when these stabilizing agents are premixed with water to form a slurry, prior to their being incorporated into the product base. The formation of a propylene glycol alginate and sodium carboxymethylcellulose aqueous slurry is a critical step.

In accordance with the method of the invention, the propylene glycol alginate and the sodium carboxymethyl-cellulose are high shear mixed together with water to prepare a stabilizer slurry. The water is preferably hot as the use of hot water requires less mixing time. Preferably, at least about 15 parts by weight water to one part by weight total stabilizers is used to form the slurry in order to achieve sufficient hydration of the stabilizers. The water and stabilizers are subjected to high shear mixing to form a slurry, which is then incorporated into a base for the juice-containing product. The base containing the stabilizer is homogenized. The stabilized base is then ready for final processing into the finished juice-containing drink by its dilution with water and the incorporation of sugar, acid, buffer, or other ingredients.

In accordance with the invention, the amount of propylene glycol alginate in the final juice-containing drink can be as low as 0.010% w/w and less, and the amount of sodium carboxymethylcellulose in the final drink can be as low as 0.005% w/w and less. The amount of propylene glycol alginate in the final juice-containing drink is in the range of about 0.006 to 0.012% w/w, and the amount of sodium carboxymethylcellulose in the final drink is in the range of about 0.003 to 0.006% w/w. The use of such small quantities of the stabilizing agents has the advantages of reducing product costs and the avoidance of a slimy or gummy mouthfeel to the final product (which could otherwise be imparted by larger quantities of the stabilizing agents). Juice-containing products produced in accordance with the invention maintain their turbidity (which reflects the uniform dispersion of the solids throughout the drink) and exhibit only very little sedimentation of insoluble solids, even after long storage periods.

Without intending to be bound by any theory, it is believed that the formation of the slurry to result in hydration of the stabilizers is critical because the stabilizers are thereby protected by a coating of water. Without the formation of the slurry, it is believed that the acids of the product impede the requisite hydration of the stabilizers upon addition of the stabilizers to the product.

DETAILED DESCRIPTION OF THE INVENTION

The stabilizing system of the invention is comprised of a mixture of a propylene glycol alginate and sodium carboxymethly-cellulose.

One benefit of the present invention is the ability to stabilize a juice-containing product with a stabilizer system without appreciably adversely affecting (i.e., increasing) the viscosity of the product as perceived by the consumer. This is attributable to the fact that the propylene glycol alginate utilized in the stabilizing system is a low viscosity variety. One preferred low viscosity propylene glycol alginate which is commercially available is sold under the name Kelcoloid O (The NutraSweet Kelco Company). The trade publication KELCOLOID O and KELCOLOID DO published by the manufacturer of Kelcoloid O indicate that such propylene glycol alginates are characterized by viscosity values of between about 50 and 175 centipoise for 2% w/w aqueous solutions thereof as measured at 25° C. with a Brookfield Model LV viscometer (no. 2 spindle, 60 rpm).

The sodium carboxymethylcellulose employed in the stabilizing system may vary more widely in its viscosity. However, low viscosity varieties are preferred, for example, the commercially available sodium carboxymethylcellulose 7LXF (Hercules Incorporated). According to the trade publication AQUALON SODIUM CARBOXYMETHYLCELLULOSE published by the manufacturer of the product 7LXF, such sodium carboxymethylcelluloses are characterized by viscosity values of between about 25 to 50 centipoise for 2% w/w aqueous solutions thereof measured at 25° C. with a Brookfield Model LVF Viscometer (no. 1 spindle, 60 rpm). In addition to having a low viscosity, this material has the further advantage of being finely granulated, and therefore exhibits excellent hydration when used in the present invention. Higher viscosity sodium carboxymethylcellulose may also be employed, such as 7MF from Hercules Inc. though these are not preferred. The 7MF (medium viscosity variety) sodium carboxymethylcellulose is characterized by viscosity values of between 100 to 800 centipoise for 2% w/w aqueous solutions measured at 25° C.

The quantities of each stabilizer are chosen so as to achieve effective stabilization of the particular juice-containing product (i.e., prevention or reduction of solids separation) while minimizing undesired changes in organoleptic properties such as flavor and mouthfeel. As such, the quantities chosen will depend, for example, upon the type stabilizer employed (e.g., low or medium viscosity), the relative use rate ratios of the stabilizers, and the type product being treated. Utilization of too little of the stabilizer system will result in ineffective stabilization whereas an excess amount of the stabilizer system may impart an undesirable slimy or gummy mouthfeel to the product. Too much stabilizer can also undesirably thicken the product.

In accordance with the invention, lesser amounts of the propylene glycol alginate and the sodium carboxymethylcellulose may be used than in the prior art. Typically, additive levels will fall within the range of from about 0.006 to about 0.012% w/w for the propylene glycol alginate and from about 0.003 to about 0.006% w/w for the sodium carboxymethylcellulose, where % w/w is the percent by weight of the stabilizer in the total weight of the finished single-strength product. Hence, additive levels of the stabilizer system to the product base must be chosen so as to result in the amounts of the stabilizers within the mentioned levels after the base is reconstituted to a single-strength product.

Preferably, the ratio (by weight) of the amount of propylene glycol alginate to the amount of sodium carboxymethylcellulose in the stabilizing system is about 2 to 1, respectively.

In accordance with the invention, the stabilizing agents are added to the base (e.g., concentrate) for the juice-containing product. By the base for the juice-containing product we mean the intermediate product which exists prior to being reconstituted with water and usually prior to the addition of sweetener. The base or intermediate product may be a manufactured concentrate which is intended to be further processed by the same or a different manufacturer, typically at some different location, to a properly diluted product which is then sold to the ultimate consumer. In such a case, the stabilizer system must be present in the concentrate, comprised of water, juice solids and other optional ingredients, as it leaves the first manufacturer.

It has been discovered that the preparation of an aqueous stabilizing system slurry prior to incorporating the stabilizers into the product base is critical to attaining effective reduction of solids separation when using relatively small quantities of the stabilizers. In accordance with the method of the invention, the propylene glycol alginate and the sodium carboxymethylcellulose are added to water, which is preferably hot for example at a temperature of about 110° F. Water at ambient temperatures may also be used however this will require a greater mixing time to form the slurry. The stabilizers and water must then be subjected to high shear mixing to form the stabilizer slurry. In order to achieve effective hydration of the stabilizers, at least about 15 parts by weight water to one part by weight total stabilizers is used to form the slurry. Lesser amounts of water may not achieve effective hydration of the stabilizers. Preferably, the slurry is prepared by adding the stabilizers to the water while the water is already being high shear mixed, though this is not critical. The mixing may be carried out in any commercially available high shear mixer, such as an APV Crepaco Liquiverter (Model CLV-100). The mixing is preferably carried out for at least 10 minutes at a speed of 1800 rpm.

The stabilizer slurry is then added to a base for the product in amounts which will eventually result in the above mentioned weight percents in the finished single-strength product. The base and stabilizer slurry are mixed and then homogenized. Preferably, homogenization is carried out in a two stage homogenizer at a pressure of about 2500 psi in the first stage and at a pressure of about 500 psi in the second stage. However, single stage homogenization is also acceptable. An example of a suitable two-stage homogenizer which may be used is a APV Gaulin Homogenizer Model No. MS45.

After homogenization, the stabilized base (i.e., intermediate product) is ready for storage or processing into the finished product. Processing of the intermediate product into the finished product requires reconstitution with water and usually the addition of sweetener (e.g., sugar, high fructose corn syrup, etc . . . ) Methods for reconstituting an intermediate base product to a finished single-strength juice-containing product are well known in the art, and any one of these methods may be used to reconstitute the intermediate product of the present invention.

Fruits which may be used as the basis for the fruit juice-containing products to which the present invention is applicable include lemon, grapefruit, lime, orange, tomato, pineapple, tangerine, wesos (water extracted soluble orange solids), apricot, peach, pear, mango and the like, as well as mixtures of juices from one or more such pulp containing products. Additionally, the stabilizer system and method of the present invention may be employed to reduce or prevent solids separation in products wherein fruit juices are combined with vegetable-derived juices and in products solely containing such vegetable juices.

The stabilizer system of the present invention possesses the advantages of ease of incorporation into the manufacturing process, compatibility with conventional ingredients of juice-containing products, lack of significant effect on the viscosity of the product, and absence of disadvantageous organoleptic effects, particularly gummy or slimy mouth-feel. The stabilizer system has the effect of reducing separation and sedimentation of insoluble solids in the finished juice-containing product over long storage periods as reflected by the fact that the stabilized product does not lose a significant amount of its turbidity over time. In fact, the stabilizer system may actually increase turbidity of a typical fruit punch product.

As will be apparent from the more detailed Examples which follow, the stabilizer system employed in the present invention is uniquely and surprisingly superior to known stabilizers in its ability to reduce turbidity loss and sedimentation in fruit juice-containing products.

EXAMPLE I 4265 grams of an orange drink base was first prepared from the following ingredients:

| | |
|---|---|
| Orange Juice Concentrate (65.7° Brix, 4.64% Acid) | 4062.3 g. |
| Ascorbic Acid | 103.2 g. |
| Orange Flavor | 93.4 g. |
| Color | 5.8 g. |

These ingredients were mixed to form the base product. Separately, a stabilizer system slurry was prepared by high shear mixing the following ingredients:

| | |
|---|---|
| Water (75° F.) | 526.5 g. |
| Sodium carboxymethylcellulose (Hercules CMC-7LXF) | 11.4 g. |
| Propylene glycol alginate (Kelco Kelcoloid 0) | 22.8 g. |

The slurry was mixed into the orange base, and the mixture was homogenized in two stages at a pressure of 2500 psi in the first stage and 500 psi in the second stage. An APV Gaulin Model 15MR8TP homogenizer was used.

Four gallons of a single strength orange drink were prepared from the stabilized base product by adding water, high fructose corn syrup, citric acid and potassium citrate as follows:

| | |
|---|---|
| Water | 12,940 g. |
| High fructose corn syrup-42 | 2,566.9 g. |
| Stabilized orange base product (from above) | 338.0 g. |
| Citric Acid | 36.9 g. |
| Potassium Citrate | 11.5 g. |

In this finished single strength orange drink, the amount of sodium carboxymethylcellulose present was 0.005% w/w and the amount of propylene glycol alginate was 0.01% w/w, based on the total weight of the finished product.

EXAMPLE II 938 grams of a fruit punch drink base was first prepared from the following ingredients:

| | |
|---|---|
| Orange Juice Concentrate (60.0° Brix, 3.3% Acid) | 623.1 g. |
| Pineapple Juice Concentrate (60.0° Brix, 3.0% Acid) | 172.2 g. |
| Ascorbic Acid | 22.4 g. |
| Fruit Punch Flavor | 31.6 g. |
| Citric Acid | 85.1 g. |
| Color | 3.4 g. |

These ingredients were mixed to form the base product. Separately, a stabilizer system slurry was formed from the following ingredients:

| | |
|---|---|
| Water (75° F.) | 90.0 g. |
| Sodium carboxymethylcellulose (Hercules CMC-7LXF) | 2.0 g. |
| Propylene glycol alginate (Kelco Kelcoloid 0) | 4.0 g. |

The slurry was mixed into the fruit punch base, and the mixture was homogenized at a pressure of 2500 psi in the first stage and 500 psi in the second stage. An APV Gaulin Model 15MR8TP homogenizer was used.

Ten gallon(s) of a single strength fruit punch drink were prepared from the stabilized base product by adding water, high fructose corn syrup, and preservative as follows:

| | |
|---|---|
| Water | 32,680.6 g. |
| High fructose corn syrup-42 | 5,783.9 g. |
| Stabilized fruit punch base product (from above) | 1,033.8 g. |
| Preservative | 93.0 g. |

In this finished single strength fruit punch drink, the amount of sodium carboxymethylcellulose present was 0.005% w/w and the amount of propylene glycol alginate was 0.01% w/w, based on the total weight of the finished product.

In order to determine the stability of the stabilized fruit punch product, namely its resistance to the separation of solids, turbidity tests were performed. An initial turbidity measurement on the stabilized finished product freshly prepared as above was 136 NTU (Nephalometric Turbidity Units) as measured on a Hach Turbidimeter Model 2100N. For comparison, a fruit punch drink was prepared as described above, but without the stabilizer system for use as a control. The initial turbidity measurement for the control was 128 NTU. The higher turbidity of the product vs. the control reflects the extent of dispersion of the juice insoluble solids in the product. Greater turbidity measurements reflect more desirable, uniform dispersion of cloudy products.

Both the control and the stabilized finished products were stored without agitation for two weeks at 95° F., whereupon turbidity was again measured. The control exhibited a turbidity of 94 NTU, which represents a 27% decrease. This reflects a significant separation of solids from the product. On the other hand, the stabilized product had a turbidity of 120 NTU, which only represents a 12% decrease. Hence, it can be seen that much less solids separation occurred in the stabilized product than for the control.

What is claimed is:

1. A method for reducing separation of solids in a finished juice-containing product, comprising the steps of:
   forming a base for a juice-containing product;
   forming a slurry of propylene glycol alginate and sodium carboxymethylcellulose in water;
   incorporating the slurry into said base in amounts such that the finished juice-containing product will include from about 0.006 to 0.012% w/w of propylene glycol alginate and from about 0.003 to 0.006% w/w of sodium carboxymethylcellulose; and
   subsequently reconstituting the base with water in amounts to form a finished juice-containing product containing from about 0.006 to 0.012% w/w propylene glycol alginate and from 0.003 to 0.006% w/w sodium carboxymethylcellulose.

2. The method according to claim 1, wherein the propylene glycol alginate, the sodium carboxymethylcellulose and the water are subjected to high shear mixing to form the slurry which is incorporated into the base.

3. The method according to claim 2, wherein at least about 15 parts by weight water to 1 part by weight total propylene glycol alginate and sodium carboxymethylcellulose are used to form the slurry.

4. The method according to claim 3, wherein the finished product contains propylene glycol alginate and sodium carboxymethyl-cellulose in a weight ratio of about 2 to 1.

5. The method according to claim 3, further comprising the step of homogenizing the base containing the propylene glycol alginate and the sodium carboxymethylcellulose prior to the step of reconstituting with water.

6. The method according to claim 5, wherein the step of homogenizing is carried out in two stages.

7. The method according to claim 6, wherein the step of homogenizing is carried out in a first stage at a pressure of about 2500 psi and in a second stage at a pressure of about 500 psi.

8. The method according to claim 5, wherein the finished product contains propylene glycol alginate and sodium carboxymethyl-cellulose in a weight ratio of about 2 to 1.

9. The method according to claim 8, wherein the finished product contains about 0.01% w/w propylene glycol alginate and about 0.005% w/w sodium carboxymethylcellulose.

10. The method according to claim 8, wherein the propylene glycol alginate has a viscosity of from about 50 to 175 centipoise for a 2% w/w aqueous solution thereof and the sodium carboxymethylcellulose has a viscosity of from about 25 to 50 centipoise for a 2% w/w aqueous solution thereof.

11. The method according to claim 5, wherein the propylene glycol alginate has a viscosity of from about 50 to 175 centipoise for a 2% w/w aqueous solution thereof and the sodium carboxymethylcellulose has a viscosity of from about 25 to 50 centipoise for a 2% w/w aqueous solution thereof.

12. The method according to claim 1, further comprising the step of homogenizing the base containing the propylene glycol alginate and the sodium carboxymethylcellulose prior to the step of reconstituting with water.

13. The method according to claim 1, wherein the finished product contains propylene glycol alginate and sodium carboxymethylcellulose in a weight ratio of about 2 to 1.

14. The method according to claim 13 wherein the finished product contains about 0.01% w/w propylene glycol alginate and about 0.005% w/w sodium carboxymethylcellulose.

15. A method for stabilizing an intermediate juice-containing product which, when diluted with water to form a finished juice-containing product will exhibit reduced separation of solids, comprising the steps of:
   preparing a concentrate as an intermediate product for a juice-containing product;
   preparing a slurry of propylene glycol alginate and sodium carboxymethylcellulose in water; and
   incorporating the slurry into the intermediate product to form a stabilized intermediate product the slurry being incorporated in an amount such that the finished juice-containing product will contain from about 0.006 to 0.012% w/w propylene glycol alginate and from 0.003 to 0.006% w/w sodium carboxymethylcellulose.

16. The method according to claim 15, wherein the propylene glycol alginate, the sodium carboxymethylcellulose and the water are subjected to high shear mixing prior to form the slurry which is incorporated into the intermediate product.

17. The method according to claim 16, wherein at least about 15 parts by weight water to 1 part by weight total propylene glycol alginate and sodium carboxymethylcellulose are used to form the slurry.

18. The method according to claim 17, wherein the intermediate product containing the slurry is homogenized.

19. The method according to claim 18, wherein the water which is used to form the slurry has a temperature of from about 70° to 120° F.

20. The method according to claim 18, wherein homogenization is conducted in two stages.

21. The method according to claim 18, wherein the propylene glycol alginate has a viscosity of from about 50 to 175 centipoise for a 2% w/w aqueous solution thereof and the sodium carboxymethylcellulose has a viscosity of from about 25 to 50 centipoise for a 2% w/w aqueous solution thereof.

22. The method according to claim 15, wherein the water which is used to form the slurry has a temperature of from about 70° to 120° F.

23. A juice-containing product, comprising: water, juice solids, from 0.006 to 0.012% w/w propylene glycol alginate and from 0.003 to 0.006% w/w sodium carboxymethylcellulose, said propylene glycol alginate and carboxymethylcellulose being effective to reduce separation of solids in said product.

24. The juice-containing product according to claim 23, wherein the propylene glycol alginate and the sodium carboxymethylcellulose are present in a weight ratio of about 2 to 1.

25. The juice-containing product according to claim 24, which contains about 0.01% w/w propylene glycol alginate and about 0.005% w/w sodium carboxymethylcellulose.

26. The juice-containing product according to claim 23, wherein the propylene glycol alginate has a viscosity of from about 50 to 175 centipoise for a 2% w/w aqueous solution thereof and the sodium carboxymethylcellulose has a viscosity of from about 25 to 50 centipoise for a 2% w/w aqueous solution thereof.

* * * * *